United States Patent Office.

EDWARD P. WOODS, DANIEL SHERWOOD, AND CYRUS H. LATHAM, OF LOWELL, MASSACHUSETTS, ASSIGNEES OF DANIEL SHERWOOD.

*Letters Patent No.* 32,791, *dated July* 9, 1861; *reissue No.* 3,908, *dated April* 5, 1870.

COFFEE-STRAINER.

The Schedule referred to in these Letters Patent and making part of the same.

Be it known that DANIEL SHERWOOD, of Lowell, in the county of Middlesex and State of Massachusetts, did invent a new and improved Strainer, to be attached to the nozzle or spout of tea or coffee-pots, or other vessels, for the purpose of straining or filtering the liquids poured from them, of which the following is a specification.

*Nature and Objects of the Invention.*

This invention consists in the construction of a strainer provided with a spring, so that it can be attached to the spout of a tea or coffee-pot, or other vessel, in order to separate the grounds or sediment from the liquid; and It has for its object the straining or filtering of the liquid as it is discharged from the orifice of the spout or nozzle of the vessel.

*Description of the Drawings.*

Figure 1 illustrates the invention attached to the spout of a tea or coffee-pot.

Figure 2 is a perspective view of the strainer and the spring for attaching it to the vessel.

*General Description.*

A represents the strainer, composed of a hemispherical-shaped cup of fine wire-cloth secured to the rim *a*. It may be made of any desired size, but is ordinarily constructed quite small, though sufficiently large to insure its receiving the stream of liquid from the vessel.

The bail B, secured to the rim *a*, is formed with an eye, *b*, by which it is connected to the spring C.

The spring C may be made of any material possessing sufficient elasticity to hold the strainer securely to the vessel, and of any desired shape that will not obstruct the flow of the liquid from the spout in which it is inserted.

As the strainer is held in place alone by the friction produced by virtue of the elasticity of the spring, it may be readily attached to and detached from the vessel at pleasure, and yet be always held in position with security when in use.

In the spring C, represented in the drawings, the coil *d* imparts the required elasticity to the prongs or arms, and keeps the angular portions *e e* in contact with the interior surface of the spout, while the main stem *f* is so arranged that it is held in line, or nearly so, with the center of the spout.

*Claim.*

As a new article of manufacture, a strainer provided with a spring to hold it to the spout of a coffee or other pot or vessel, for the purpose of straining or filtering liquids, substantially as described and specified.

EDWARD P. WOODS.
DANIEL SHERWOOD.
C. H. LATHAM.

Witnesses:
SAML. W. STICKNEY,
JAMES S. HOVEY.